United States Patent
Hecking et al.

(10) Patent No.: US 11,091,584 B2
(45) Date of Patent: Aug. 17, 2021

(54) BLOCKED POLYISOCYANATE COMPOSITION BASED ON PENTAMETHYLENE 1,5-DIISOCYANATE

(71) Applicant: Covestro Deutschland AG, Leverkusen (DE)

(72) Inventors: Andreas Hecking, Langenfeld (DE); Florian Johannes Stempfle, Cologne (DE); Christoph Eggert, Cologne (DE); Michael Grahl, Leverkusen (DE); Dorota Greszta-Franz, Solingen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/747,790

(22) PCT Filed: Jul. 20, 2016

(86) PCT No.: PCT/EP2016/067297
§ 371 (c)(1),
(2) Date: Jan. 26, 2018

(87) PCT Pub. No.: WO2017/021150
PCT Pub. Date: Feb. 9, 2017

(65) Prior Publication Data
US 2018/0208709 A1    Jul. 26, 2018

(30) Foreign Application Priority Data

Jul. 31, 2015 (EP) ..................... 15179321

(51) Int. Cl.
| | | |
|---|---|---|
| *C08G 18/79* | (2006.01) | |
| *C08G 18/62* | (2006.01) | |
| *C08G 18/73* | (2006.01) | |
| *C09D 175/06* | (2006.01) | |
| *C08G 18/28* | (2006.01) | |
| *C08G 18/42* | (2006.01) | |
| *C08G 18/80* | (2006.01) | |
| *C09D 175/04* | (2006.01) | |
| *C08G 18/24* | (2006.01) | |
| *C08G 18/75* | (2006.01) | |

(52) U.S. Cl.
CPC ......... *C08G 18/791* (2013.01); *C08G 18/246* (2013.01); *C08G 18/2895* (2013.01); *C08G 18/423* (2013.01); *C08G 18/4236* (2013.01); *C08G 18/6229* (2013.01); *C08G 18/73* (2013.01); *C08G 18/75* (2013.01); *C08G 18/792* (2013.01); *C08G 18/8093* (2013.01); *C09D 175/04* (2013.01); *C09D 175/06* (2013.01)

(58) Field of Classification Search
CPC .... C08G 18/791; C08G 18/75; C08G 18/423; C08G 18/8093; C08G 18/792; C08G 18/6229; C08G 18/4236; C08G 18/2895; C08G 18/73; C08G 18/246; C09D 175/04; C09D 175/06
See application file for complete search history.

(56) References Cited

U.S. PATENT DOCUMENTS

| | | |
|---|---|---|
| 4,007,215 A | 2/1977 | Hartmann et al. |
| 4,677,180 A | 6/1987 | Schmitt et al. |
| 5,350,825 A | 9/1994 | König et al. |
| 5,849,855 A | 12/1998 | Usui et al. |
| 5,914,383 A | 6/1999 | Richter et al. |
| 6,583,216 B1 | 6/2003 | König et al. |
| 6,652,919 B1 | 11/2003 | Campbell et al. |
| 9,376,404 B2 | 6/2016 | Nakagawa et al. |
| 2002/0055603 A1* | 5/2002 | Figge .................. C08G 18/0823 528/45 |
| 2003/0032719 A1 | 2/2003 | Sapper |
| 2011/0045191 A1 | 2/2011 | Jones et al. |
| 2013/0338330 A1* | 12/2013 | Nakagawa ............ C07C 263/10 528/65 |

FOREIGN PATENT DOCUMENTS

DE    3001060 A1    7/1981

OTHER PUBLICATIONS

Petersen, S., Niedermolekulare Umsetzungsprodukte aliphatischer Diisocyanate, Liebigs Ann. Chem. 1949, 562, pp. 205-229.
Jones, R., A Second crosslinking stategy, Hybrid blocked isocyanates combine different chemistries leading to enhanced properties, European Coatings Journal, 2001, 9, 48-51.
J. Prakt. Chem., 336 (1994), The Synthesis of Aliphatic Polyisocyanates Containing Biuret, Isocyanurate or Uretdione Backbones for Use in Coatings, pp. 185-200.

* cited by examiner

*Primary Examiner* — Rabon A Sergent
(74) *Attorney, Agent, or Firm* — John E. Mrozinski, Jr.

(57) ABSTRACT

The present invention relates to a polyisocyanate composition comprising a formation component having isocyanate groups, the isocyanate groups having been reacted to an extent of ≥98% with at least one CH-acidic compound, characterized in that the formation component consists to an extent of ≥51% by weight of at least one polyisocyanate based on pentamethylene 1,5-diisocyanate having a content of isocyanurate trimer of ≤60 area %, based on the total weight of the polyisocyanates based on pentamethylene 1,5-diisocyanate, and the remaining proportion up to 100% by weight of the total amount of polyisocyanates present in the formation component consists of at least one aliphatic or cycloaliphatic polyisocyanate. The present invention further provides a one-component system comprising the polyisocyanate composition, a process for producing a coating on a substrate, and the coatings obtainable from the one-component system.

12 Claims, No Drawings

BLOCKED POLYISOCYANATE COMPOSITION BASED ON PENTAMETHYLENE 1,5-DIISOCYANATE

CROSS-REFERENCE TO RELATED APPLICATIONS

This Application is a National Phase Application of PCT/EP2016/067297 filed Jul. 20, 2016, which claims priority to European Application No. 15179321.3, filed Jul. 31, 2015, both of which are incorporated herein by reference.

FIELD OF THE INVENTION

The invention relates to a polyisocyanate composition comprising a formation component having isocyanate groups, the isocyanate groups having been reacted to an extent of ≥98% with at least one CH-acidic compound. The invention further relates to the use of the polyisocyanate composition for producing a one-component system and the one-component system comprising the polyisocyanate composition. The invention also further relates to a process for producing a coating on a substrate, the coating obtainable by the process and also a composite composed of the coating and the substrate.

BACKGROUND OF THE INVENTION

The use of CH-acidic compounds such as, for example, diethyl malonate, as blocking agent for isocyanate groups has long been known (cf. Petersen, S. in Liebigs Ann. Chem. 1949, 562, 205-229). Advantageous in the case of these blocking agents is the low baking range of 80-120° C. for producing coating materials. Moreover, they have a lower risk potential in contrast to other blocking agents.

Described as a disadvantage of such CH-acidic blocked polyisocyanates is their tendency for crystallization. For instance, a diethyl malonate-blocked polyisocyanurate based on 1,6-hexamethylene diisocyanate (HDI) solidifies after a few days into a glassy mass despite a considerable amount of solvent (cf. Jones, R. in *Eur. Coat. J.* 2001, 9, 48-51 or EP 0 600 314).

Although DE 24 36 872 describes liquid malonic ester-blocked lacquer polyisocyanates, these are based exclusively on isophorone diisocyanate (IPDI) and result in only a low crosslinking density due to their low functionality. The corresponding blocked products based on IPDI trimer with higher functionality are highly viscous, result in brittle coatings and are not suitable for flexible coating materials (cf. DE 30 01 060).

IPDI is also often used in combination with other linear, aliphatic diisocyanates for producing stable malonic ester-blocked polyisocyanates (such as DESMODUR BL 3475 from Covestro AG). In this case, an attempt is made by the addition of the cycloaliphatic diisocyanate to delay the tendency to crystallize and thus to achieve a compromise between crystallization stability and flexibility, but in both cases no optimum could be achieved.

In addition to the use of polyisocyanate mixtures, the tendency to crystallize can additionally be reduced by the use of various blocking agents. For instance, ethyl acetoacetate (cf. WO 2000/050178) or butanone oxime (cf. WO 01/57109) is used in the literature as second blocking agent. These mixed blocked products are less reactive and tend to thermal yellowing. Moreover, the baking temperature of the second blocking agent is usually clearly above the baking range of the malonic esters which leads in addition to undesired side reactions.

Stable products should also be provided by mixed blocking with other blocking agents such as diisopropylamine (EP 0 600 314) or 3,5-dimethylpyrazole (WO 02/55577). However, an increase in the baking temperatures is also necessary for such products which leads to problems discussed above.

A disadvantage of the processes described here for improving storage stability is in addition that all these measures increase the complexity of the production process and thereby significantly reduce the economic efficiency.

A further possibility to stabilize malonic ester-blocked polyisocyanates is the addition of low molecular weight mono- or difunctional compounds having groups reactive to isocyanate. For instance, U.S. Pat. No. 4,677,180 describes improved storage stability by adding a short-chain diol. Such isocyanate-reactive additives remain in the coating material however and adversely affect the properties of the coating.

In addition, modification by a reaction of the blocked polyisocyanate with formaldehyde offers access to storage-stable products (e.g. in WO 01/16202). However, this procedure is not relevant in practice due to the labeling of formaldehyde as carcinogenic and mutagenic.

In U.S. Pat. No. 5,849,855, stable malonic ester-blocked crosslinkers were obtained by adjusting the pH by adding, for example, dibutyl phosphate. These additives remain in the coating material and lead to the disadvantages already described.

Although the use of malonic ester-blocked isocyanates based on 1,5-pentamethylene diisocyanate is already mentioned within a long list of possible blocking agents in application EP 2 684 867 A1, no specific descriptions yet exist which disclose a technical or economic advantage of such blocked systems.

One possibility in which polyisocyanates blocked with CH-acidic compounds can be obtained, which have a very low tendency to crystallize, are storage-stable, and have physical curing starting at a lower temperature and a higher resistance of the coatings obtainable from these polyisocyanates to organic solvents than the systems known from the prior art, is not yet known.

SUMMARY OF THE INVENTION

The present invention provides a polyisocyanate composition blocked with CH-acidic compounds, which has a very low tendency to crystallize, is storage-stable and achieves physical curing starting at relatively low temperature and a higher resistance of the coatings obtainable from this polyisocyanate composition to organic solvents in comparison to the systems known from the art.

These and other advantages and benefits of the present invention will be apparent from the Detailed Description of the Invention herein below.

DETAILED DESCRIPTION OF THE INVENTION

The present invention provides a polyisocyanate composition comprising a formation component having isocyanate groups, the isocyanate groups having been reacted to an extent of ≥98% with at least one CH-acidic compound, characterized in that the formation component consists of ≥51% by weight of at least one polyisocyanate based on 1,5-pentamethylene diisocyanate having a content of isocyanurate trimer of ≤60 area %, based on the total weight of the polyisocyanates based on 1,5-pentamethylene diisocyanate, and the remaining proportion up to 100% by weight of the total amount of polyisocyanates present in the formation component consists of at least one aliphatic or cycloaliphatic polyisocyanate.

The advantage of a predominant use of at least one polyisocyanate based on 1,5-pentamethylene diisocyanate having a content of isocyanurate trimer of ≤60 area %, based on the total weight of the polyisocyanates based on 1,5-pentamethylene diisocyanate, is that it offers in addition to an improved storage stability, also physical curing starting at relatively low temperature and also a higher resistance of the coatings obtainable from the polyisocyanate composition according to the invention to organic solvents.

In the present case, storage stability is understood to mean that the polyisocyanate composition according to the invention is present as an optically clear solution for at least 6 weeks at room temperature without recognizable solids formation.

In the present context, trimer structures are understood to mean the following isocyanurate structural units formed from diisocyanates which are statistically linked to one another according to the oligomeric distribution:

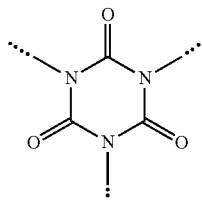

Isocyanurate group

The value of the content of isocyanurate trimer as a proportion by weight based on the total weight of the respective polyisocyanates refers according to the invention to the compounds in the polyisocyanate composition which comprise exactly one isocyanurate group and three isocyanate groups. The content of isocyanurate trimer is determined as area percent (area %) by gel permeation chromatography (GPC) in accordance with DIN 55672-1.

According to the invention, the references to "comprising", "containing" etc., preferably signify "substantially consisting of" and especially preferably "consisting of".

In a first preferred embodiment, the formation component consists of at least 60% by weight, preferably at least 70% by weight and particularly preferably at least 80% by weight, of at least one polyisocyanate based on 1,5-pentamethylene diisocyanate having a content of isocyanurate trimer of ≤60 area %, based on the total weight of the polyisocyanates based on 1,5-pentamethylene diisocyanate. This results, inter alia, in the advantage that the storage stability can be further increased.

This additionally results in the advantage that the biobased proportion of the polyisocyanate composition according to the invention can be further increased. It is therefore especially preferred in this case if the formation component consists of 100% by weight of at least one polyisocyanate based on 1,5-pentamethylene diisocyanate.

In a further preferred embodiment, the content of isocyanurate trimer is ≥36 area % and ≤56 area %, preferably ≥38 area % and ≤51 area %, based on the total weight of the polyisocyanates based on 1,5-pentamethylene diisocyanate.

According to a further preferred embodiment, the remaining proportion up to 100% by weight of the total amount present in the formation component consists of at least one aliphatic or cycloaliphatic polyisocyanate and is at least 5% by weight, preferably at least 10% by weight and particularly preferably at least 15% by weight.

The polyisocyanates based on 1,5-pentamethylene diisocyanate are any oligomeric polyisocyanates that are obtainable by modification of 1,5-pentamethylene diisocyanate (PDI) and have uretdione, isocyanurate, allophanate, biuret, iminooxadiazinedione and/or oxadiazinetrione structure or any desired mixtures of such polyisocyanates. These polyisocyanates are produced by methods known per se for isocyanate oligomerization, such as are described, for example, in J. Prakt. Chem. 336 (1994) 185-200 and EP 0 798 299 A1, by reacting a portion of the isocyanate groups of PDI to form polyisocyanate molecules consisting of at least two diisocyanate molecules, and a generally subsequent removal of unreacted monomeric PDI by distillation or extraction.

The PDI used for preparing the polyisocyanates based on 1,5-pentamethylene diisocyanate is obtainable in various ways, for example by phosgenation in the liquid or gas phase or by a phosgene-free route, for example by thermal urethane cleavage proceeding from 1,5-diaminopentane obtained preferably by means of biotechnology via decarboxylation of the naturally occurring amino acid lysine.

The isocyanurate trimer content can be adjusted by appropriate reaction regime and thus the trimerization reaction is preferably terminated after reaching the desired isocyanurate trimer content. This may be accomplished, for example, by cooling the reaction mixture to room temperature. Generally, however, the reaction is ended by adding one or more catalyst poisons known to those skilled in the art and optionally subsequent brief heating of the reaction mixture, for example to a temperature above 80° C.

The aliphatic or cycloaliphatic polyisocyanates which are different from polyisocyanates based on 1,5-pentamethylene diisocyanate are any oligomeric polyisocyanates that are obtainable by modification of suitable monomeric diisocyanates and have uretdione, isocyanurate, allophanate, biuret, iminooxadiazinedione and/or oxadiazinetrione structure or any desired mixtures of such polyisocyanates. These polyisocyanates are produced by methods known per se for isocyanate oligomerization, such as are described, for example, in J. Prakt. Chem. 336 (1994) 185-200, by reacting a portion of the isocyanate groups of monomeric diisocyanates to form polyisocyanate molecules consisting of at least two diisocyanate molecules, and a generally subsequent removal of unreacted monomeric diisocyanates by distillation or extraction.

Suitable monomeric diisocyanates are especially those from the molecular weight range of 140 to 400, such as e.g. 1,4-diisocyanatobutane, 1,6-hexamethylene diisocyanate (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 2,4- and 2,6-diisocyanato-1-methylcyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 2,4'-diisocyanatodicyclohexylmethane, 1-isocyanato-1-methyl-4(3)isocyanatomethylcyclohexane, bis(isocyanatomethyl)norbornane, 1,3- and 1,4-bis(isocyanatomethyl)benzene (XDI) or any desired mixtures of such diisocyanates.

It is generally preferred if the residual monomer content of monomeric diisocyanates in the polyisocyanate composition according to the invention is below 0.5% by weight, particularly preferably below 0.3% by weight. The residual monomer contents can be determined, by gas chromatography for example, in accordance with DIN EN ISO 10283.

It is further preferable that the remaining proportion up to 100% by weight of the total amount of polyisocyanates present in the formation component consists of at least one aliphatic polyisocyanate. This results, inter alia, in the advantage that coatings obtainable from this polyisocyanate composition have particularly good physicochemical properties.

The CH-acidic compounds are, for example, esters or cyclic ketones, such as e.g. Meldrum's acid, diethyl malonate, dimethyl malonate, methyl acetoacetate, ethyl acetoacetate, di-tert-butyl malonate, 1-tert-butyl 3-methyl malonate, tert-butyl acetoacetate, 2-acetylacetoxyethyl methacrylate, acetylacetone, cyanoethyl acetate, cyclopentanone-2-carboxymethyl ester, cyclopentanone-2-carboxyethyl ester, cyclohexanone-2-carboxymethyl ester, cyclohexanone-2-carboxyethyl ester, cyclopentanone-2-carbonitrile or cyclopentanone-2-carbonylmethane.

In a further preferred embodiment, the CH-acidic compound is selected from the group comprising Meldrum's acid, diethyl malonate, dimethyl malonate, methyl acetoacetate, ethyl acetoacetate, di-tert-butyl malonate, 1-tert-butyl 3-methyl malonate, tert-butyl acetoacetate, 2-acetylacetoxyethyl methacrylates, acetylacetone, cyanoethyl acetate, cyclopentanone-2-carboxymethyl ester, cyclopentanone-2-carboxyethyl ester, cyclohexanone-2-carboxymethyl ester and cyclohexanone-2-carboxyethyl ester, is preferably selected from the group comprising diethyl malonate, dimethyl malonate and ethyl acetoacetate and is particularly preferably diethyl malonate.

In addition to the formation component having isocyanate groups, the polyisocyanate composition according to the invention may comprise further compounds, and so, in a further preferred embodiment, at least one crystallization inhibitor is present selected from the group comprising low molecular weight mono- or difunctional compounds having groups reactive to isocyanate, preferably selected from the group comprising branched, low molecular weight mono- or difunctional compounds having groups reactive to isocyanate. Suitable crystallization inhibitors are described, for example, in U.S. Pat. No. 4,677,180.

Surprisingly, however, the polyisocyanate composition according to the invention is also storage-stable when the polyisocyanate composition is free of crystallization inhibitors. This results in the advantage that the coating properties are not adversely affected.

In a development of the invention, it is particularly preferred if the CH-acidic compounds are also biobased, preferably when the diethyl malonate and/or the ethyl acetoacetate have been produced from renewable raw materials. To this end, more and more efforts are being made, for example diethyl malonate, malonic acid itself or ethyl acetoacetate are already being produced starting from renewable raw materials. Biobased diethyl malonate is obtainable, for example, from Lygos Inc. (San Francisco, Calif., USA).

In general, the polyisocyanate composition according to the invention can be present free of solvents, but it is also possible for one or more solvents inert to the reactive groups of the components used to be present.

Suitable solvents are, for example, the customary lacquer solvents known per se such as, e.g. ethyl acetate, butyl acetate, ethylene glycol monomethyl or monoethyl ether acetate, 1-methoxyprop-2-yl acetate, 3-methoxy-n-butyl acetate, acetone, 2-butanone, 4-methyl-2-pentanone, cyclohexanone, toluene, xylene, chlorobenzene, white spirit, more highly substituted aromatics, of the kind available commercially, for example, under the names SOLVENT-NAPHTHA, SOLVESSO, ISOPAR, NAPPAR, VARSOL (ExxonMobil Chemical Central Europe, Cologne, Germany) and SHELLSOL (Shell Deutschland Oil GmbH, Hamburg, Germany), and also solvents such as propylene glycol diacetate, diethylene glycol dimethyl ether, dipropylene glycol dimethyl ether, diethylene glycol ethyl and butyl ether acetate, N-methylpyrrolidone and N-methylcaprolactam, or any desired mixtures of such solvents.

In a further preferred embodiment, the polyisocyanate composition according to the invention comprises at least one organic solvent, preferably at least butyl acetate and particularly preferably at least butyl acetate which has been produced from renewable raw materials.

By choosing the amount of solvent, the solids content of the polyisocyanate composition according to the invention can be varied within wide limits in the preferred co-use of organic solvents. In this case, it is especially preferred if the polyisocyanate composition according to the invention has a solids content of ≥10 and ≤95% by weight, preferably ≥25 and ≤85% by weight.

The polyisocyanate composition according to the invention is obtained by reacting the isocyanate groups of the polyisocyanates present in the formation component having isocyanate groups with the CH-acidic compounds mentioned above. The isocyanate groups are preferably reacted with the CH-acidic compounds under basic conditions, for example sodium methoxide may be used as base. The reaction is considered as complete when the isocyanate group band (NCO band, absorption maximum at 2263-2275 cm$^{-1}$) has disappeared from the IR spectrum.

By means of the reaction, the isocyanate groups of the polyisocyanates are converted into stable adducts which result in storage-stable mixtures with polyols at room temperature. At temperatures of >80° C., the blocking agent releases the isocyanate group for crosslinking with the polyol component.

Therefore, the polyisocyanate composition according to the invention is particularly well suited for producing a one-component system and, thus, such use is further provided by the invention. For this purpose, the polyisocyanate composition according to the invention is mixed with further compounds described below.

The invention further provides a one-component system comprising at least one polyisocyanate composition according to the invention, at least one polyol, at least one leveling agent and optionally further auxiliaries and additives. The one-component system according to the invention is distinguished advantageously by physical drying starting at relatively low temperature in comparison to conventional blocked one-component systems.

Suitable polyols are, for example, polyether polyols, polyester polyols, polycarbonate polyols or polyacrylate polyols.

Any auxiliaries and additives present may, for example, be the following that are known to those skilled in the art: cobinders, desiccants, fillers, cosolvents, color or effect pigments, thickeners, matting agents, light stabilizers, coatings additives such as dispersants, thickeners, defoamers and other auxiliaries such as adhesives, fungicides, bactericides, stabilizers or inhibitors and catalysts or emulsifiers.

The invention further relates to a process for producing a coating on a substrate, in which the one-component system according to the invention is applied to the substrate and is cured at a temperature of >80° C. and <130° C., preferably >90° C. and <110° C.

The application of the one-component system according to the invention can be effected by known methods, for example by spraying, painting, flow coating or with the aid of rollers or coating bars onto any desired substrates.

Examples of suitable substrates include metal, glass, stone, ceramic materials, concrete, plastics, composites, textiles, leather or paper, which may optionally also be provided with customary primers prior to coating. Particularly preferred substrates are substrates having a surface of metal and/or plastic.

By means of the process according to the invention it is possible to obtain coatings which have improved resistance to organic solvents. In addition, the polyisocyanate composition according to the invention allows physical drying of the one-component system starting at relatively low temperature in comparison to the known systems.

Therefore the invention further provides a coating, produced or which can be produced by the process according to the invention.

As well as the coating itself, the invention further provides a composite composed of the coating according to the invention and a substrate having a surface of metal and/or plastic.

The invention is elucidated in more detail below by way of examples.

EXAMPLES

All reported percentages are based on weight unless otherwise stated.

The NCO contents were determined by titrimetry in accordance with DIN EN ISO 11909.

The residual monomer contents were measured in accordance with DIN EN ISO 10283 by gas chromatography with an internal standard.

All the viscosity measurements were made with a PHYSICA MCR 51 rheometer from Anton Paar Germany GmbH (Germany) to DIN EN ISO 3219.

The Hazen color number was measured by spectrophotometry according to DIN EN 1557 in a 40 mm rectangular cuvette with a LICO 400 spectrophotometer from Lange, Germany.

The isocyanurate trimer content was determined in accordance with DIN 55672-1 by gel permeation chromatography (GPC). The determination range for the column set employed was in the range between 100 and 20 000 Daltons. Evaluation was carried out using WIN GPC from Polymer Standard Services GmbH, Mainz.

The storage stability was determined by optically evaluating the blocked polyisocyanate compositions in each case after storage at room temperature for 1, 2, 3, 4, 5, 6 days, 1, 2, 3, 4, 5 and 6 weeks. If an optically clear solution was present after at least 6 weeks without recognizable solids formation, the corresponding blocked polyisocyanate was classified as storage stable.

Polyisocyanates

Polyisocyanate A1:

An initial charge of 1000 g (6.49 mol) of pentamethylene 1,5-diisocyanate (PDI) in a four-neck flask equipped with stirrer, reflux condenser, $N_2$ passage tube and internal thermometer was degassed three times at room temperature by applying a vacuum of about 50 mbar and venting with nitrogen. Subsequently, the mixture was heated to 60° C. and the catalyst solution (1.5% N,N,N-trimethyl-N-benzylammonium hydroxide solution in a 1:1 mixture of methanol and 2-ethyl-1-hexanol) was metered in at such a rate that the temperature of the reaction mixture, in spite of the exothermically excipient trimerization reaction, increased to a maximum of 80° C. On reaching an NCO content of 36.5% by weight, dibutyl phosphate (equimolar amount based on trimethylbenzylammonium hydroxide used) was used to stop the reaction, and the unreacted monomeric PDI was removed at a temperature of 140° C. and a pressure of 0.5 mbar on a thin-film evaporator. A virtually colorless polyisocyanurate polyisocyanate was obtained, having the following indices:

NCO content: 21.2%
NCO functionality (calc.): about 3.5
Content of isocyanurate trimer according to GPC: 40%
Viscosity (23° C.): 9850 mPas
Monomeric PDI: 0.05%
Color number (APHA): 34 Hazen Polyisocyanate A2:

By the method described for polyisocyanate component A1 and using the catalyst solution described therein, 1000 g (6.49 mol) of PDI were converted down to an NCO content of 47.8%. After the catalyst had been deactivated and then the unconverted monomeric PDI had been removed by distillation with the aid of a thin-film evaporator at 140° C. and 0.5 mbar, a virtually colorless polyisocyanurate polyisocyanate was obtained, having the following indices:

NCO content: 24.2%
NCO functionality (calc.): about 3.5
Content of isocyanurate trimer according to GPC: 64%
Viscosity (23° C.): 2510 mPas
Monomeric PDI: 0.05%
Color number (APHA): 53 Hazen Polyisocyanate A3:

Isocyanurate group-containing polyisocyanates based on HDI with an NCO content of 21.8%, an average NCO functionality of 3.5 (according to GPC), a content of monomeric HDI of 0.1% and a viscosity of 3000 mPas (23° C.). Content of isocyanurate trimer according to GPC: 53%

Polyisocyanate A4:

90% solution in butyl acetate of an isocyanurate group-containing polyisocyanate based on HDI with an NCO content of 17.8%, an average NCO functionality of 4.0 (according to GPC), a content of monomeric HDI of 0.1% and a viscosity of 1800 mPas (23° C.).
Content of isocyanurate trimer according to GPC: 31%

Polyisocyanate Compositions

Example 1 (Comparative Example)

90.8 g of polyisocyanate A2 and 55.8 g (0.35 mol) of diethyl malonate are initially charged under dry nitrogen at room temperature with stirring. Subsequently, 1.3 g of $NaOCH_3$ solution (30% in methanol) together with 27.9 g (0.17 mol) of diethyl malonate were added dropwise. After the exothermic reaction subsided, the mixture was further stirred at 70° C. for 4 hours until the NCO band in the IR spectrum disappeared. The product was then adjusted with butyl acetate to a solids content of 70% by weight. A clear colorless solution is obtained. The viscosity of the blocked polyisocyanate crosslinker thus obtained was 710 mPas at 23° C.

Example 2 (Inventive)

395.5 g of polyisocyanate A1 and 213.6 g (1.3 mol) of diethyl malonate were initially charged under dry nitrogen at room temperature with stirring. Subsequently, 4.8 g of NaOCH₃ solution (30% in methanol) together with 106.8 g (0.7 mol) of diethyl malonate were added dropwise. After the exothermic reaction subsided, the mixture was further stirred at 70° C. for 4 hours until the NCO band in the IR spectrum disappeared. The product was then adjusted with butyl acetate to a solids content of 70% by weight. A clear colorless solution is obtained. The viscosity of the blocked polyisocyanate crosslinker thus obtained was 1250 mPas at 23° C.

Example 3 (Inventive)

283.4 g of polyisocyanate A1 and 138.1 g of polyisocyanate A3 together with 229.6 g (1.44 mol) of diethyl malonate were initially charged under dry nitrogen at room temperature with stirring. Subsequently, 5.2 g of NaOCH₃ solution (30% in methanol) together with 114.8 g (0.71 mol) of diethyl malonate were added dropwise. After the exothermic reaction subsided, the mixture was further stirred at 70° C. for 4 hours until the NCO band in the IR spectrum disappeared. The product was then adjusted with butyl acetate to a solids content of 70% by weight. A clear colorless solution is obtained. The viscosity of the blocked polyisocyanate crosslinker thus obtained was 957 mPas at 23° C.

Example 4 (Comparative Example)

207.6 g of polyisocyanate A1 and 202.3 g of polyisocyanate A3 together with 224.2 g (1.41 mol) of diethyl malonate were initially charged under dry nitrogen at room temperature with stirring. Subsequently, 5.0 g of NaOCH₃ solution (30% in methanol) together with 112.1 g (0.69 mol) of diethyl malonate were added dropwise. After the exothermic reaction subsided, the mixture was further stirred at 70° C. for 4 hours until the NCO band in the IR spectrum disappeared. The product was then adjusted with butyl acetate to a solids content of 70% by weight. A clear colorless solution is obtained. The viscosity of the blocked polyisocyanate crosslinker thus obtained was 755 mPas at 23° C.

Example 5 (Comparative Example, Blocked HDI Polyisocyanate)

125.2 g of polyisocyanate A3 with 69.4 g, (0.44 mol) of diethyl malonate were initially charged under dry nitrogen with stirring. Subsequently, 1.6 g of NaOCH₃ solution (30% in methanol) together with 34.7 g (0.21 mol) of diethyl malonate were added dropwise. After the exothermic reaction subsided, the mixture was further stirred at 70° C. for 4 hours until the NCO band in the IR spectrum disappeared. The product was then adjusted with butyl acetate to a solids content of 70% by weight. This gives a clear colorless solution which crystallized out after cooling to room temperature overnight.

Example 6 (Comparative Example, Blocked HDI Polyisocyanate)

470.1 g of polyisocyanate component A4 with 213.6 g, (1.3 mol) of diethyl malonate were initially charged under dry nitrogen with stirring. Subsequently, 1.6 g of NaOCH₃ solution (30% in methanol) together with 106.8 g (0.7 mol) of diethyl malonate were added dropwise. After the exothermic reaction subsided, the mixture was further stirred at 70° C. for 4 hours until the NCO band in the IR spectrum disappeared. The product was then adjusted with butyl acetate to a solids content of 70% by weight. This gives a clear colorless solution, which slowly turned cloudy after cooling to room temperature and crystallized out fully after three days.

Storage Stability Testing

To test the storage stability, the blocked polyisocyanate compositions obtained were stored at room temperature and checked at regular intervals over a period of several weeks, the results of which are presented in Table 1.

TABLE 1

Storage stability testing of the polyisocyanate compositions

| | Example 1 (comp.) | Example 2 (inv.) | Example 3 (inv.) | Example 4 (comp.) | Example 5 (comp.) | Example 6 (comp.) |
|---|---|---|---|---|---|---|
| After 1 day | | | | | Crystallization | |
| After 2 days | | | | | | |
| After 3 days | | | | | | Crystallization |
| After 4 days | | | | Crystallization | | |
| After 5 days | | | | | | |
| After 6 days | | | | | | |
| After 1 week | | | | | | |
| After 2 weeks | Crystallization | | | | | |
| After 3 weeks | | | | | | |
| After 4 weeks | | | | | | |
| After 5 weeks | | | | | | |
| After 6 weeks | | stable, clear sol. | stable, clear sol. | | | |

"Crystallization" in Table 1 means the presence of mainly crystalline components of the polyisocyanate composition.

Performance Testing

In order to compare the performance-related suitability to practical application, one-component PUR baking clearcoats were produced using the formulations listed in Table 2. In each case, the diethyl malonate-blocked PDI polyisocyanate of inventive Example 2 was investigated compared to a diethyl malonate-blocked mixed polyisocyanate based on an HDI/IPDI mixture (DESMODUR BL 3475, Covestro AG), catalyzed and uncatalyzed.

TABLE 2

Overview of the compounds and parameters used

| | |
|---|---|
| Polyisocyanate: | Example 2 (inventive), NCO content blocked 8.2% DESMODUR ® BL 3475: Mixture of 7% by weight IPDI polyisocyanurate and 35% by weight HDI polyisocyanurate, 21% by weight diethyl malonate and 11% by weight ethyl acetoacetate and 26% by weight butyl acetate/solvent naphtha (1:1), NCO content blocked 8.2%, Covestro AG |
| Binder: | SETALUX D A 665, Nuplex, solids 65%, acid number 6.9 mg KOH/g, OH content 3.04% DESMOPHEN T 1665, Covestro AG, solids 65%, acid number 5.5 mg KOH/g, OH content 1.7% |
| Catalyst: | DABCO T 12, Air Products and Chemicals, 0.5% calculated on solid fraction of the binder |
| Leveling agent: | BYK 355, Byk Chemie, 0.2% of overall formulation |
| Solvent: | Butyl acetate/methoxypropyl acetate/xylene (ratio: 1/1/1) |
| Coating material solids: | 55% |
| Crosslinking ratio: | NCO:OH = 1:1 |
| Application: | 120 μm wet film on glass |
| Drying: | 15 min air ventilation at room temperature/20 min at 100° C. (110° C., or 120° C., or 130° C.) |

Investigations Conducted
  Flow time: DIN 4 mm cup (DIN 53211)
  Dynamic mechanical analysis (DMA):
  Device: DMA 2980 analyzer (TA Instruments)
  Calibration: Temperature Indium in glass fabric
  Measurement: Dual cantilever clamping
  Deformation amplitude 0 2 mm, 2 Hz excitation
  Heating from RT to +250° C., heating rate 2K/min
  Solvent resistance: Exposure time 1 min, or 5 min (DIN EN ISO 4628-1) Pendulum hardness according to König: DIN EN ISO 1522

The flow time gives general information about the processing capability of a formulation in the various application methods, e.g. spraying, rolling, dipping.

The flow times shown in Table 4 of the two blocked polyisocyanates, catalyzed and uncatalyzed, in combination with the polyester show that the differences in the flow times are not of technical significance as regards coating and can therefore be ignored.

The dynamic mechanical analysis is a measure of the physically measurable reactivity in relation to temperature and gives information to those skilled in the art whether and in which temperature range the curing (crosslinking) begins. As shown in Table 3, the systems blocked based on PDI polyisocyanate are advantageous in the DMA investigations compared to DESMODUR BL 3475, and it was found that the start of curing and start of crosslinking (hardening onset) takes place at a distinctly lower temperature in comparison to the established standard system with DESMODUR BL 3475. This allows the user, when using the polyisocyanate composition according to the invention, to carry out the curing at a lower temperature, which improves the economic as well as ecological assessment of his process.

Pendulum hardness according to König (DIN EN ISO 1522) is considered as a measure of the resilience of coatings to mechanical stress. Here, the results summarized in Table 4 show only marginal differences at the respective baking temperature. The polyisocyanate of inventive Example 2 and the DESMODUR BL 3475 (catalyzed as well as uncatalyzed) are compared in the formulations with polyester and polyacrylate.

Studies on the solvent fastnesses of coatings under the action of organic solvents represents the crosslinking density in the polymer. This practice-relevant test for evaluating the behavior of the coating towards organic solvents provides those skilled in the art with information as to whether the system has sufficient crosslinking as a function of the baking temperature.

To test the solvent fastness, the baked films were treated and evaluated with technical qualities of the organic solvents butyl acetate (BA), methoxypropyl acetate (MPA), xylene (X) and acetone (Ac) in accordance with DIN EN ISO 4628-1, where according to the DIN EN standard in the evaluation 0=no change up to 5=coating destroyed.

The results of the solvent fastnesses after 1 minute (Table 5) and after 5 minutes (Table 6) show that the polyisocyanate composition according to the invention in the respective formulations to be compared (catalyzed or uncatalyzed) using the two binders specified (DESMOPHEN T 1665 and SETALUX D A 665) has a markedly higher resistance to the solvents used at the baking temperatures investigated. Thus, the earlier physical curing of the polyisocyanate according to the invention observed in the DMA is also confirmed by the application-related investigation of the solvent fastnesses.

TABLE 3

DMA analyses

| | Start of curing in ° C. | Hardening onset in ° C. | Polyol |
|---|---|---|---|
| Example 2 without catalyst | 76.0 | 89.5 | DESMOPHEN T 1665 |
| Example 2 with catalyst | 75.0 | 88.5 | |
| DESMODUR BL 3475 without catalyst | 82.0 | 92.5 | |
| DESMODUR BL 3475 with catalyst | 83.5 | 93.5 | |
| Example 2 without catalyst | 74.5 | 84.5 | SETALUX D A 665 |
| Example 2 with catalyst | 74.0 | 84.5 | |
| DESMODUR BL 3475 without catalyst | 79.5 | 89.5 | |
| DESMODUR BL 3475 with catalyst | 82.0 | 89.5 | |

TABLE 4

Flow times [sec.] of the formulations prior to baking and the pendulum hardnesses [sec.] of the coating systems baked at the specified temperatures

| | Flow time DIN 4 mm in sec. | 100° C. | 110° C. | 120° C. | 130° C. | Polyol |
|---|---|---|---|---|---|---|
| Example 2 without catalyst | 48 | 121 | 126 | 126 | 128 | DESMOPHEN T 1665 |
| Example 2 with catalyst | 48 | 130 | 130 | 133 | 121 | |
| DESMODUR BL 3475 without catalyst | 41 | 111 | 140 | 145 | 155 | |
| DESMODUR BL 3475 with catalyst | 41 | 105 | 133 | 146 | 154 | |
| Example 2 without catalyst | 43 | 144 | 195 | 193 | 200 | SETALUX D A 665 |
| Example 2 with catalyst | 43 | 146 | 193 | 200 | 203 | |
| DESMODUR BL 3475 without catalyst | 30 | 151 | 194 | 200 | 203 | |
| DESMODUR BL 3475 with catalyst | 30 | 120 | 187 | 201 | 204 | |

TABLE 5

Solvent fastnesses after 1 minute solvent exposure at various baking temperatures of the coating system

| | 100° C. | | | | 110° C. | | | | 120° C. | | | | 130° C. | | | | |
|---|---|---|---|---|---|---|---|---|---|---|---|---|---|---|---|---|---|
| | BA | MPA | X | Ac | BA | MPA | X | Ac | BA | MPA | X | Ac | BA | MPA | X | Ac | Polyol |
| Example 2 without catalyst | 2 | 2 | 2 | 5 | 2 | 2 | 3 | 5 | 1 | 1 | 2 | 4 | 1 | 1 | 2 | 4 | DESMOPHEN T 1665 |
| Example 2 with catalyst | 2 | 2 | 2 | 5 | 2 | 2 | 3 | 4 | 1 | 2 | 2 | 4 | 0 | 1 | 2 | 4 | |
| DESMODUR BL 3475 without catalyst | 2 | 3 | 3 | 5 | 2 | 2 | 2 | 4 | 1 | 2 | 1 | 4 | 1 | 1 | 2 | 4 | |
| DESMODUR BL 3475 with catalyst | 2 | 3 | 3 | 5 | 2 | 2 | 2 | 4 | 1 | 1 | 2 | 4 | 1 | 1 | 1 | 4 | |
| Example 2 without catalyst | 0 | 0 | 0 | 4 | 0 | 0 | 0 | 3 | 0 | 0 | 0 | 3 | 0 | 0 | 0 | 3 | SETALUX D A 665 |
| Example 2 with catalyst | 0 | 0 | 0 | 4 | 0 | 0 | 0 | 4 | 0 | 0 | 0 | 4 | 0 | 0 | 0 | 4 | |
| DESMODUR BL 3475 without catalyst | 2 | 2 | 3 | 5 | 1 | 2 | 3 | 4 | 1 | 2 | 2 | 4 | 1 | 2 | 2 | 4 | |
| DESMODUR BL 3475 with catalyst | 2 | 2 | 2 | 5 | 1 | 1 | 0 | 4 | 1 | 2 | 2 | 4 | 0 | 1 | 1 | 4 | |

TABLE 6

Solvent fastnesses after 5 minute solvent exposure at various baking temperatures of the coating system

| | 100° C. | | | | 110° C. | | | | 120° C. | | | | 130° C. | | | | |
|---|---|---|---|---|---|---|---|---|---|---|---|---|---|---|---|---|---|
| | BA | MPA | X | Ac | BA | MPA | X | Ac | BA | MPA | X | Ac | BA | MPA | X | Ac | Polyol |
| Example 2 without catalyst | 4 | 4 | 4 | 5 | 4 | 4 | 4 | 5 | 4 | 4 | 4 | 5 | 4 | 4 | 4 | 5 | DESMOPHEN T 1665 |
| Example 2 with catalyst | 4 | 4 | 4 | 5 | 4 | 4 | 4 | 5 | 4 | 4 | 4 | 5 | 4 | 4 | 4 | 5 | |

TABLE 6-continued

Solvent fastnesses after 5 minute solvent exposure at various baking temperatures of the coating system

| | 100° C. | | | | 110° C. | | | | 120° C. | | | | 130° C. | | | | |
|---|---|---|---|---|---|---|---|---|---|---|---|---|---|---|---|---|---|
| | BA | MPA | X | Ac | BA | MPA | X | Ac | BA | MPA | X | Ac | BA | MPA | X | Ac | Polyol |
| DESMODUR BL 3475 without catalyst | 4 | 3 | 4 | 5 | 4 | 3 | 3 | 5 | 4 | 3 | 3 | 4 | 4 | 3 | 3 | 4 | |
| DESMODUR BL 3475 with catalyst | 4 | 4 | 4 | 5 | 4 | 4 | 4 | 5 | 4 | 4 | 4 | 5 | 4 | 4 | 4 | 4 | |
| Example 2 without catalyst | 1 | 2 | 2 | 4 | 0 | 0 | 1 | 4 | 0 | 0 | 0 | 4 | 0 | 0 | 0 | 4 | SETALUX D A 665 |
| Example 2 with catalyst | 0 | 1 | 1 | 4 | 0 | 0 | 1 | 4 | 0 | 0 | 0 | 4 | 0 | 0 | 0 | 4 | |
| DESMODUR BL 3475 without catalyst | 4 | 4 | 4 | 5 | 3 | 3 | 4 | 5 | 0 | 2 | 2 | 4 | 1 | 2 | 2 | 4 | |
| DESMODUR BL 3475 with catalyst | 5 | 4 | 5 | 5 | 2 | 2 | 2 | 5 | 2 | 2 | 2 | 5 | 1 | 2 | 2 | 5 | |

The invention claimed is:

1. A polyisocyanate composition comprising a formation component having isocyanate groups reacted to an extent of >98% with at least one CH-acidic compound,
    the formation component consisting of from ≥51% by weight of at least one polyisocyanate based on 1,5-pentamethylene diisocyanate having a content of isocyanurate trimer of from ≥36 area % to ≤60 area % determined by gel permeation chromatography (GPC) in accordance with DIN 55672-1, and at least 5% by weight of at least one aliphatic or cycloaliphatic polyisocyanate which differs from the at least one polyisocyanate based on 1,5-pentamethylene diisocyanate,
    wherein the percents by weight total 100% and are based on the total amount of polyisocyanates present in the formation component.

2. The polyisocyanate composition according to claim 1, wherein the formation component consists of at least 60% by weight, of at least one polyisocyanate based on 1,5-pentamethylene diisocyanate having a content of isocyanurate trimer of ≤60 area %, based on the total weight of the polyisocyanates based on 1,5-pentamethylene diisocyanate.

3. The polyisocyanate composition according to claim 1, wherein the content of isocyanurate trimer is ≥36 area % and ≤56 area % by gel permeation chromatography (GPC) in accordance with DIN 55672-1, based on the total weight of the polyisocyanates based on 1,5-pentamethylene diisocyanate.

4. The polyisocyanate composition according to claim 1, characterized in that the CH-acidic compound is selected from the group consisting of Meldrum's acid, diethyl malonate, dimethyl malonate, methyl acetoacetate, ethyl acetoacetate, di-tert-butyl malonate, 1-tert-butyl 3-methyl malonate, tert-butyl acetoacetate, 2-acetylacetoxyethyl methacrylates, acetylacetone, cyanoethyl acetate and cyclopentanone-2-carboxymethyl ester, cyclopentanone-2-carboxyethyl ester, cyclohexanone-2-carboxymethyl ester and cyclohexanone-2-carboxyethyl ester.

5. The polyisocyanate composition according to claim 4, wherein at least one of the diethyl malonate and the ethyl acetoacetate have been produced from renewable raw materials.

6. The polyisocyanate composition according to claim 1, wherein the polyisocyanate composition is free of crystallization inhibitors.

7. The polyisocyanate composition according to claim 1, wherein the polyisocyanate composition comprises at least one organic solvent.

8. In a process for producing a one-component system, the improvement comprising including the polyisocyanate composition according to claim 1.

9. A one-component system comprising at least one polyisocyanate composition according to claim 1, at least one polyol, at least one leveling agent and optionally further auxiliaries and additives.

10. A process for producing a coating on a substrate, in which a one-component system according to claim 9 is applied to the substrate and is cured at a temperature of >80° C. and <130° C.

11. A coating, produced or which can be produced by a process according to claim 10.

12. A composite comprising a coating according to claim 11 and a substrate having a surface of at least one of metal and plastic.

* * * * *